(12) United States Patent
Sakai

(10) Patent No.: US 12,640,604 B2
(45) Date of Patent: May 26, 2026

(54) ROTOR AND ROTATING ELECTRIC MACHINE

(71) Applicant: DENSO CORPORATION, Kariya (JP)

(72) Inventor: Masahito Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 18/527,495

(22) Filed: Dec. 4, 2023

(65) Prior Publication Data

US 2024/0097512 A1 Mar. 21, 2024

Related U.S. Application Data

(63) Continuation of application No. PCT/JP2022/022615, filed on Jun. 3, 2022.

(30) Foreign Application Priority Data

Jun. 4, 2021 (JP) ................................. 2021-094749

(51) Int. Cl.
*H02K 1/27* (2022.01)
*H02K 1/276* (2022.01)
(52) U.S. Cl.
CPC ................................... *H02K 1/276* (2013.01)
(58) Field of Classification Search
CPC ....... H02K 1/276; H02K 21/16; H02K 1/2766
See application file for complete search history.

(56) References Cited

U.S. PATENT DOCUMENTS

| | | | |
|---|---|---|---|
| 2014/0000096 A1* | 1/2014 | Takemoto | ............... H02K 1/276 |
| | | | 29/598 |
| 2018/0183285 A1 | 6/2018 | Asano et al. | |
| 2021/0184522 A1* | 6/2021 | Park | ......................... H02K 1/30 |
| 2022/0131431 A1* | 4/2022 | Coppola | .............. H02K 1/2766 |
| 2022/0255376 A1* | 8/2022 | Kusakabe | ............ H02K 1/2766 |

FOREIGN PATENT DOCUMENTS

| | | |
|---|---|---|
| JP | 2017-118797 A | 6/2017 |
| JP | 2018-085779 A | 5/2018 |

* cited by examiner

*Primary Examiner* — Thomas Truong
(74) *Attorney, Agent, or Firm* — Oliff PLC

(57) ABSTRACT

A rotor includes: a rotor core having a plurality of magnet-receiving holes formed in a folded shape that is convex radially inward; and a plurality of permanent magnets embedded respectively in the magnet-receiving holes of the rotor core. The rotor core includes a plurality of core sheets that are laminated in an axial direction. Each of the core sheets has a plurality of through-holes for magnets. The magnet-receiving holes of the rotor core are constituted of those of the through-holes of the axially-laminated core sheets which overlap each other in the axial direction. Interior surfaces of the magnet-receiving holes have irregular portions each of which is formed by a difference in position between peripheral edges of the axially-overlapping through-holes, and non-irregular portions where none of the irregular portions are formed. The permanent magnets have engaging portions located respectively in recesses of the irregular portions.

16 Claims, 8 Drawing Sheets

1ST POSITION

2ND POSITION
(ROTATED BY 45°)

ROTOR AND ROTATING ELECTRIC MACHINE

CROSS-REFERENCE TO RELATED APPLICATIONS

The present application is a continuation application of International Application No. PCT/JP2022/022615 filed on Jun. 3, 2022, which is based on and claims priority from Japanese Patent Application No. 2021-094749 filed on Jun. 4, 2021. The entire contents of these applications are incorporated by reference into the present application.

BACKGROUND

1 Technical Field

The present disclosure relates to interior permanent magnet rotors and rotating electric machines.

2 Description of Related Art

In the field of rotating electric machines, interior permanent magnet rotors have been well known which have permanent magnets embedded in a rotor core. The interior permanent magnet rotors are configured to obtain both magnet torque generated by the permanent magnets and reluctance torque generated by outer core portions located radially outside the permanent magnets.

In such interior permanent magnet rotors, the permanent magnets are configured to have a folded shape (e.g., a V-shape or a U-shape) that is convex radially inward in an axial view (see, for example, JP2017070032A). With such a configuration, it is possible to enlarge the outer core portions and the surfaces of the permanent magnets which abut the outer core portions. That is, an increase in the torque of the rotating electric machine can be expected.

SUMMARY

As described above, in a rotor which employs permanent magnets having a folded shape that is convex radially inward, the volume of outer core portions located radially outside the permanent magnets becomes large. Moreover, in the case where radially outer ends of the permanent magnets are located near an outer circumferential surface of the rotor core in order to achieve high torque, the thickness of bridge portions becomes small and thus the strength of the bridge portions is lowered; the bridge portions are those portions of the rotor core which are located between the radially outer ends of the permanent magnets and the outer circumferential surface of the rotor core. Therefore, when an axial excitation force is applied to the rotor due to, for example, an external factor, the outer core portions may vibrate in the axial direction with the bridge portions serving as fulcrums. Moreover, if the vibration of the outer core portions increases, the rotor core may become deformed.

The present disclosure has been accomplished in view of the above problem.

According to a first aspect of the present disclosure, a rotor is provided. The rotor includes: a rotor core having a plurality of magnet-receiving holes formed in a folded shape that is convex radially inward; and a plurality of permanent magnets embedded respectively in the magnet-receiving holes of the rotor core. The rotor core includes a plurality of core sheets that are laminated in an axial direction. Each of the core sheets has a plurality of through-holes for magnets.

The magnet-receiving holes of the rotor core are constituted of those of the through-holes of the axially-laminated core sheets which overlap each other in the axial direction. Interior surfaces of the magnet-receiving holes have irregular portions each of which is formed by a difference in position between peripheral edges of the axially-overlapping through-holes, and non-irregular portions where none of the irregular portions are formed. The permanent magnets have engaging portions located respectively in recesses of the irregular portions.

According to a second aspect of the present disclosure, a rotating electric machine is provided which includes a rotor and a stator. The rotor includes: a rotor core having a plurality of magnet-receiving holes formed in a folded shape that is convex radially inward; and a plurality of permanent magnets embedded respectively in the magnet-receiving holes of the rotor core. The stator is configured to apply a rotating magnetic field to the rotor. Moreover, the rotor core includes a plurality of core sheets that are laminated in an axial direction. Each of the core sheets has a plurality of through-holes for magnets. The magnet-receiving holes of the rotor core are constituted of those of the through-holes of the axially-laminated core sheets which overlap each other in the axial direction. Interior surfaces of the magnet-receiving holes have irregular portions each of which is formed by a difference in position between peripheral edges of the axially-overlapping through-holes, and non-irregular portions where none of the irregular portions are formed. The permanent magnets have engaging portions located respectively in recesses of the irregular portions.

In the above rotor and rotating electric machine, the irregular portions provided in the interior surfaces of the magnet-receiving holes engage respectively with the engaging portions of the permanent magnets in the axial direction. Consequently, it becomes possible to suppress axial vibration of outer core portions that are located radially outside the permanent magnets in the rotor core. As a result, it becomes possible to suppress deformation of the rotor core. Hence, it becomes possible to improve the strength of the rotor core against axial vibration. Moreover, in the interior surfaces of the magnet-receiving holes, there are also provided the non-irregular portions where none of the irregular portions are formed. Consequently, compared to a configuration where irregular portions are formed over the entire interior surfaces of the magnet-receiving holes, it becomes possible to suppress axial leakage magnetic flux generated due to the irregular boundaries between the magnet-receiving holes and the permanent magnets.

DESCRIPTION OF EMBODIMENTS

Hereinafter, an embodiment of a rotor and a rotating electric machine will be described.

Figure 1:
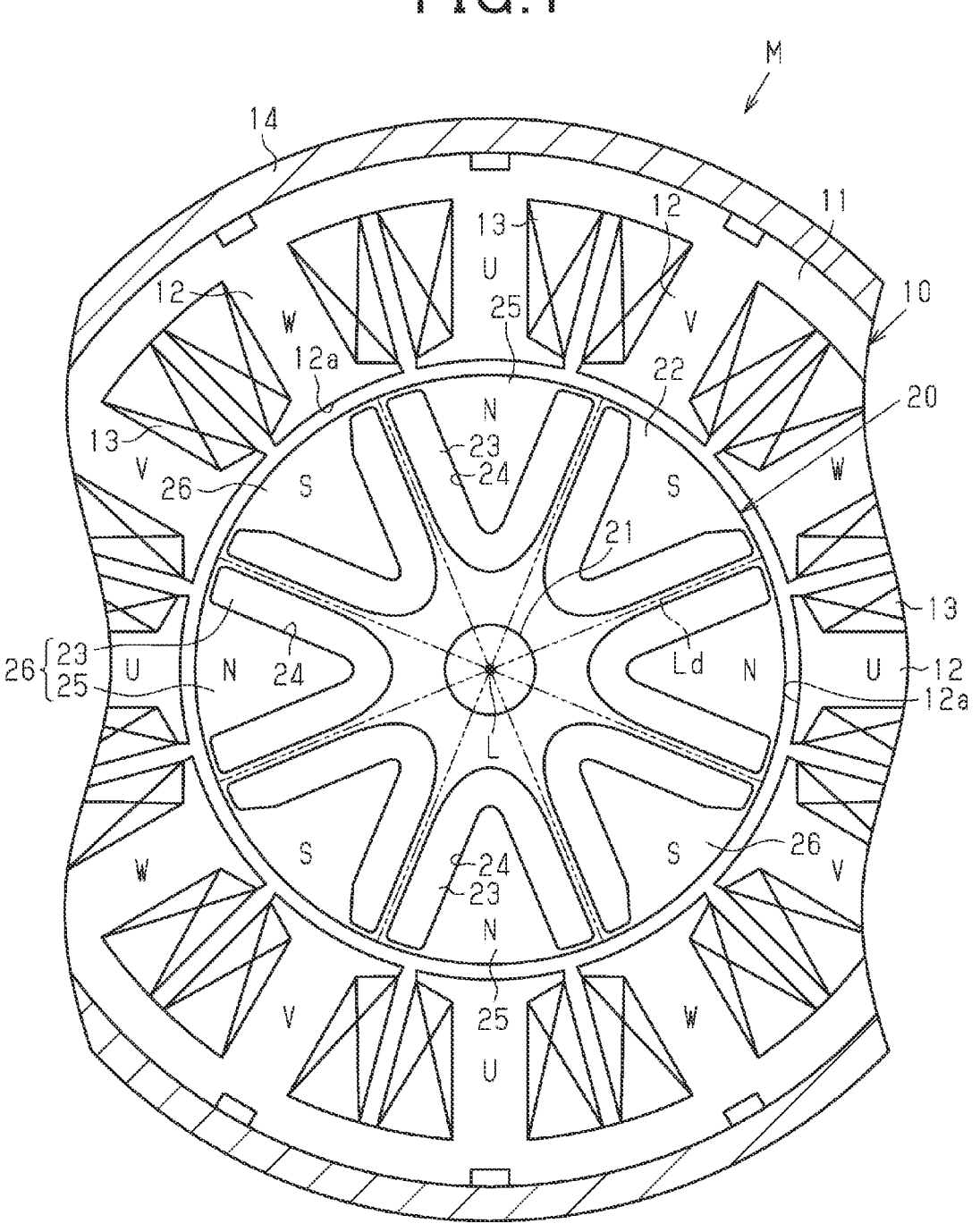
FIG. 1 is a configuration diagram of a rotating electric machine which includes an interior permanent magnet rotor according to an embodiment.

As shown in FIG. 1, a rotating electric machine M according to the present embodiment is configured as an interior permanent magnet brushless motor. The rotating electric machine M includes a substantially annular stator 10 and a substantially cylindrical rotor 20 that is rotatably arranged in a space radially inside the stator 10. The stator 10 is configured to apply a rotating magnetic field to the rotor 20.

The stator 10 includes a substantially annular stator core 11. The stator core 11 is formed of a magnetic metal material. For example, the stator core 11 may be formed by laminating a plurality of magnetic steel sheets. The stator core 11 has a plurality (more particularly, twelve in the present embodiment) of teeth 12 extending radially inward and arranged at equal intervals in a circumferential direction. All the teeth 12 are identical in shape to each other. Each of the teeth 12 has a substantially T-shaped radially inner end portion (i.e., distal end portion) and a distal end surface 12*a* formed in an arc shape along an outer circumferential surface of the rotor 20. Windings 13 are wound around the twelve teeth 12 in a concentrated winding manner That is, in the present embodiment, the number of magnetic poles of the stator 10 is set to 12. The windings 13 are connected in three phases to respectively function as a U-phase, a V-phase and a W-phase as shown in FIG. 1. Upon supply of electric power to the windings 13, the stator 10 generates a rotating magnetic field, thereby driving the rotor 20 to rotate. In addition, in the stator 10, an outer circumferential surface of the stator core 11 is fixed to an inner circumferential surface of a housing 14.

(Rotor Core 22)

The rotor 20 includes a rotating shaft 21, a substantially cylindrical rotor core 22 having the rotating shaft 21 inserted in a central part thereof, and a plurality (more particularly, eight in the present embodiment) of permanent magnets 23 embedded in the rotor core 22. That is, in the present embodiment, the number of magnetic poles of the rotor 20 is set to 8. The rotor 20 is rotatably arranged with respect to the stator 10, with the rotating shaft 21 supported by bearings (not shown) provided in the housing 14.

Figure 2:
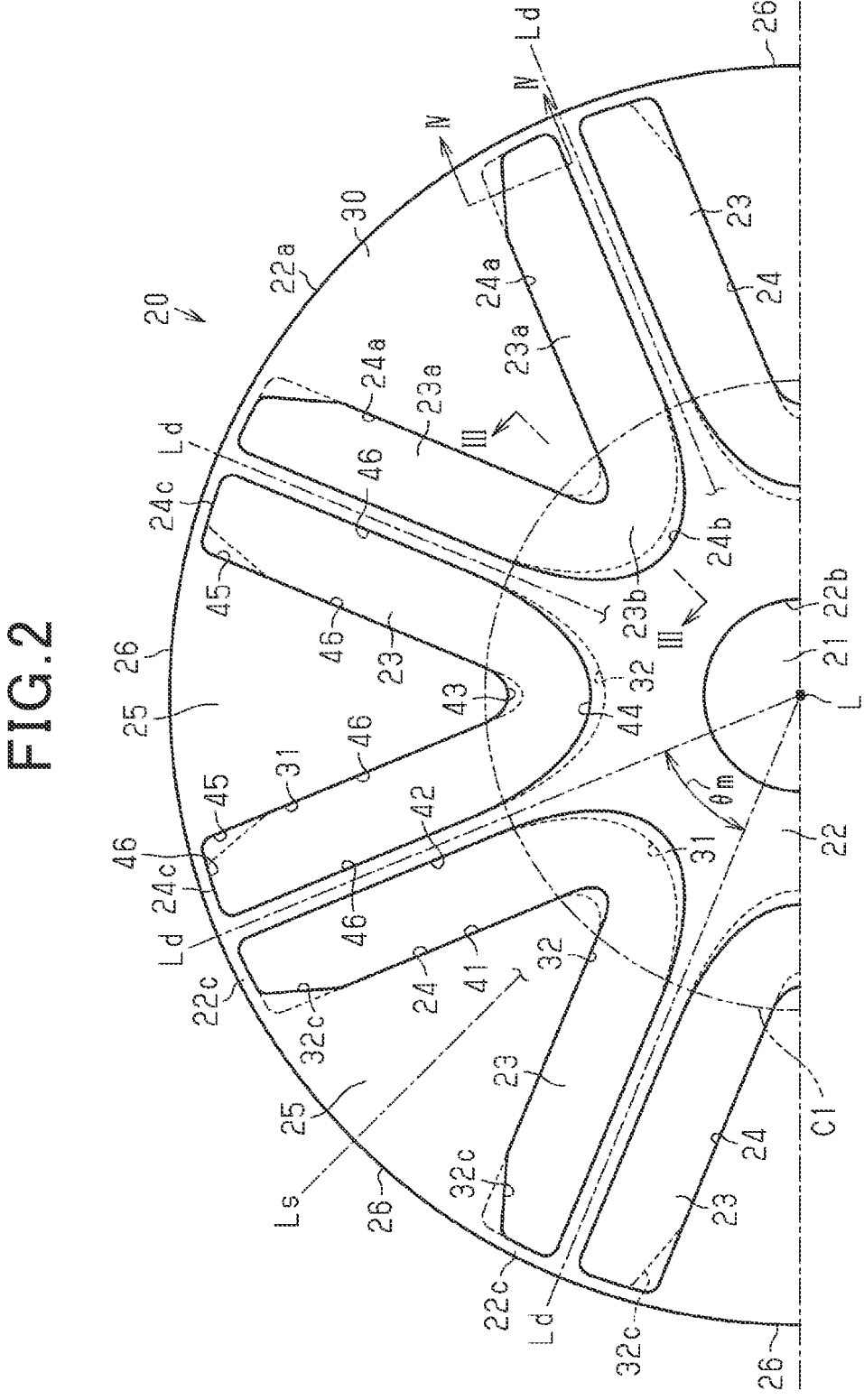
FIG. 2 is a plan view of the rotor according to the embodiment.

As shown in FIG. 2, the rotor core 22 has a plurality of magnet-receiving holes 24 for receiving the permanent magnets 23 therein. More particularly, in the present embodiment, eight magnet-receiving holes 24 are formed at equal intervals in the circumferential direction of the rotor core 22. Each of the magnet-receiving holes 24 penetrates the rotor core 22 in, for example, an axial direction. Moreover, each of the magnet-receiving holes 24 has a folded substantially V-shape that is convex radially inward when viewed in the axial direction. More specifically, each of the magnet-receiving holes 24 has, for example, a pair of straight portions 24*a* extending straight in an axial view and a curved portion 24*b* connecting radially inner ends of the pair of straight portions 24*a*.

For each of the magnet-receiving holes 24, radially outer ends 24*c* of the pair of straight portions 24*a* of the magnet-receiving hole 24 are located near an outer circumferential surface 22*a* of the rotor core 22; and the curved portion 24*b* of the magnet-receiving hole 24 is located near a shaft insertion hole 22*b* which is formed in the central part of the rotor core 22 and in which the rotating shaft 21 is inserted. Moreover, the curved portion 24*b* is located within the region of a reference circle C1 whose diameter is half the outer diameter of the rotor core 22. The reference circle C1 is a circle centering on an axis L of the rotor 20. On the other hand, the radially outer ends 24*c* of the pair of straight portions 24*a* are located outside the region of the reference circle C1. In addition, each of the magnet-receiving holes 24 is formed to extend over the entire axial length of the rotor core 22.

(Permanent Magnets 23)

In the present embodiment, the permanent magnets 23 are implemented by bonded magnets that are formed by molding and solidifying a magnet material; the magnet material is a mixture of a magnet powder and a resin. More specifically, in the present embodiment, the magnet-receiving holes 24 of the rotor core 22 serve as forming molds. The permanent magnets 23 are formed by: filling the magnet material, which has not been solidified, into the magnet-receiving holes 24 of the rotor core 22 by injection molding without any gaps remaining therein; and then solidifying the magnet material in the magnet-receiving holes 24. Consequently, the external shape of the permanent magnets 23 conforms to the shape of the magnet-receiving holes 24 of the rotor core 22. In addition, in the present embodiment, a samarium-iron nitrogen-based (i.e., SmFeN-based) magnet powder is employed as the magnet powder for forming the permanent magnets 23. It should be noted that other rare-earth magnet powders may alternatively be employed as the magnet powder for forming the permanent magnets 23.

As shown in FIG. 2, since the permanent magnets 23 are formed directly in the magnet-receiving holes 24, the permanent magnets 23 have a shape corresponding to the magnet-receiving holes 24. That is, each of the permanent magnets 23 has a folded substantially V-shape that is convex radially inward when viewed in the axial direction. More specifically, each of the permanent magnets 23 has a pair of straight portions 23*a* and a curved portion 23*b* connecting radially inner ends of the pair of straight portions 23*a*. Moreover, for each of the permanent magnets 23, the straight portions 23*a* of the permanent magnet 23 are located respectively in the straight portions 24*a* of a corresponding one of the magnet-receiving holes 24; and the curved portion 23*b* of the permanent magnet 23 is located in the curved portion 24*b* of the corresponding magnet-receiving hole 24. Furthermore, radially outer ends of the straight portions 23*a* are located near the outer circumferential surface 22*a* of the rotor core 22. In addition, each of the permanent magnets 23 has an axisymmetric shape with respect to a circumferential centerline Ls thereof passing through the axis L of the rotor 20.

As shown in FIG. 1, those portions of the rotor core 22 which are located on the inner side of the folded substantially V-shape of the permanent magnets 23 and radially outside the permanent magnets 23 function as outer core portions 25 facing the stator 10 to generate reluctance torque. When viewed along the axial direction, each of the outer core portions 25 has a substantially triangular shape with one vertex oriented toward the central part of the rotor 20. The rotor 20 has a plurality of magnetic poles 26 each including one of the permanent magnets 23 and one of the outer core portions 25. That is, the number of the magnetic poles 26 is equal to the number of the permanent magnets 23, i.e., equal to eight in the present embodiment. In other words, the number of poles of the rotor 20 is equal to eight. All the magnetic poles 26 are identical in shape to each other. In the present embodiment, the magnetic-pole opening angle θm of each of the magnetic poles 26 is 45° in mechanical angle. Moreover, the magnetic poles 26 are arranged at equal intervals in the circumferential direction. Furthermore, the rotor 20 has eight magnetic-pole boundary lines Ld each representing a boundary between an adjacent pair of the magnetic poles 26. In addition, each of the magnetic-pole boundary lines Ld extends through the axis L of the rotor 20. As shown in FIG. 1, the magnetic poles 26 function as N poles and S poles alternately in the circumferential direction. The rotor 20, which is configured to have the magnetic poles 26 as described above, can generate both magnet torque and reluctance torque.

The permanent magnets 23, which are provided in a substantially embedded manner in the magnet-receiving holes 24 of the rotor core 22, are magnetized, after solidification of the magnet material, by a magnetizing apparatus (not shown) located outside the rotor core 22, so as to function as genuine permanent magnets. More specifically, each of the permanent magnets 23 is magnetized in its thickness direction. In the present embodiment, as shown in FIG. 1, eight permanent magnets 23 are arranged in the circumferential direction of the rotor core 22 and magnetized so that the polarities of the permanent magnets 23 are alternately different in the circumferential direction.

As shown in FIG. 2, each of the magnet-receiving holes 24 has the interior surfaces thereof in contact with the corresponding permanent magnet 23 received therein; the interior surfaces include an inner side surface 41 and an outer side surface 42. The inner side surface 41 is a side surface which defines the corresponding outer core portion 25 and which is in contact with the surface of the corresponding permanent magnet 23 on the inner side of the folded substantially V-shape of the corresponding permanent magnet 23. The outer side surface 42 is a side surface which faces the inner side surface 41 in a width direction of the magnet-receiving hole 24. It should be noted that the width direction of the magnet-receiving hole 24 is a direction which is perpendicular to an extending direction of the magnet-receiving hole 24 in an axial view. It also should be noted that the extending direction of the magnet-receiving hole 24 is a direction along the folded substantially V-shape of the magnet-receiving hole 24 in an axial view. Each of the inner side surface 41 and the outer side surface 42 is a surface which extends along the folded substantially V-shape of the magnet-receiving hole 24 in an axial view.

The inner side surface 41 has a first irregular portion 43. The outer side surface 42 has a second irregular portion 44. The first irregular portion 43 is provided in that part of the inner side surface 41 which is located at the curved portion 24b of the magnet-receiving hole 24. The second irregular portion 44 is provided in that part of the outer side surface 42 which is located at the curved portion 24b of the magnet-receiving hole 24. Moreover, third irregular portions 45 are provided in parts of the inner side surface 41 which are located respectively at the radially outer ends 24c of the pair of straight portions 24a of the magnet-receiving hole 24. Furthermore, the interior surfaces of the magnet-receiving hole 24 also have non-irregular portions 46 where none of the first irregular portion 43, the second irregular portion 44 and the third irregular portions 45 are formed. In the present embodiment, the first irregular portion 43, the second irregular portion 44 and the third irregular portions 45 are formed at some locations in the extending direction of the magnet-receiving hole 24, whereas the non-irregular portions 46 are formed at the other locations in the extending direction of the magnet-receiving hole 24.

The rotor core 22 has bridge portions 22c located respectively outside the radially outer ends 24c of the straight portions 24a of the magnet-receiving holes 24. The bridge portions 22c connect the outer core portions 25 with other portions of the rotor core 22 than the outer core portions 25. In the embodiment, when the rotor core 22 is viewed alone, each of the outer core portions 25 is supported by two of the bridge portions 22c.

(Configuration of Core Sheets 30)

Figures 5A, 5B:
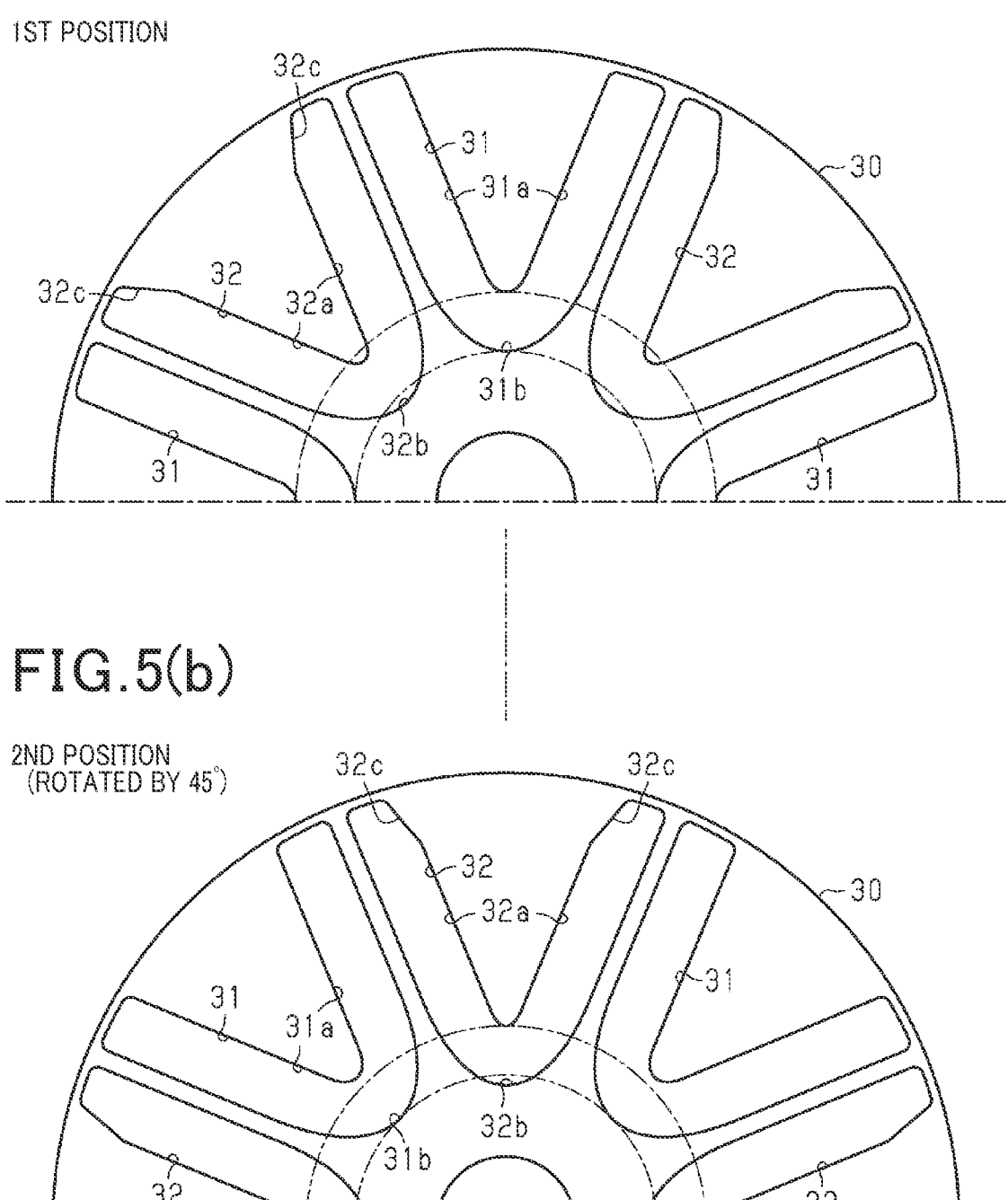
FIGS. 5(a) and 5(b) are plan views of a core sheet employed in the rotor according to the embodiment.

The rotor core 22 is formed by laminating a plurality of core sheets 30 in the direction of the axis L; the core sheets 30 are made of magnetic steel sheets. In the present embodiment, all the core sheets 30 employed in the rotor core 22 have the same configuration as shown in FIG. 5(a). Consequently, all the core sheets 30 can be managed as identical parts. In addition, the core sheet 30 shown in FIG. 5(b) appears at first glance to be different in shape from the core sheet 30 shown in FIG. 5(a). However, FIGS. 5(a) and 5(b) actually show the same core sheet 30 arranged at two different positions, i.e., at a first position in FIG. 5(a) and at a second position in FIG. 5(b); the second position is rotated with respect to the first position by an angle corresponding to one magnet-receiving hole 24, i.e., by 45° corresponding to one magnetic pole of the rotor 20.

Each of the core sheets 30 includes two types of through-holes for magnets, which have mutually different shapes. Hereinafter, the through-holes of one of the two types will be described as the first through-holes 31; and the through-holes of the other of the two types will be described as the second through-holes 32. In each of the core sheets 30, the first through-holes 31 and the second through-holes 32 are arranged alternately at intervals of 45° in the circumferential direction.

Each of the first and second through-holes 31 and 32 has a folded substantially V-shape that is convex radially inward. Specifically, each of the first through-holes 31 has a shape such that the radially inner ends of a pair of straight portions 31a are connected by a curved portion 31b. Similarly, each of the second through-holes 32 has a shape such that the radially inner ends of a pair of straight portions 32a are connected by a curved portion 32b.

In the present embodiment, in the process of laminating the core sheets 30 to form the rotor core 22, the core sheets 30 are laminated so that those core sheets which are arranged at the first position shown in FIG. 5(a) and those core sheets which are arranged at the 45°-rotated second position shown in FIG. 5(b) alternate in units of one core sheet. Consequently, in the resultant rotor core 22, each of the magnet-receiving holes 24 is constituted of a mixture of the first and second through-holes 31 and 32 of the core sheets 30; and the first and second through-holes 31 and 32 alternately overlap in the axial direction.

In the present embodiment, in the interior surfaces of each of the magnet-receiving holes 24, the first irregular portion 43, the second irregular portion 44 and the third irregular portions 45 are each formed by the difference in position between peripheral edges of the first through-holes 31 and peripheral edges of the second through-holes 32.

(First Irregular Portion 43 and Second Irregular Portion 44)

Figure 3:
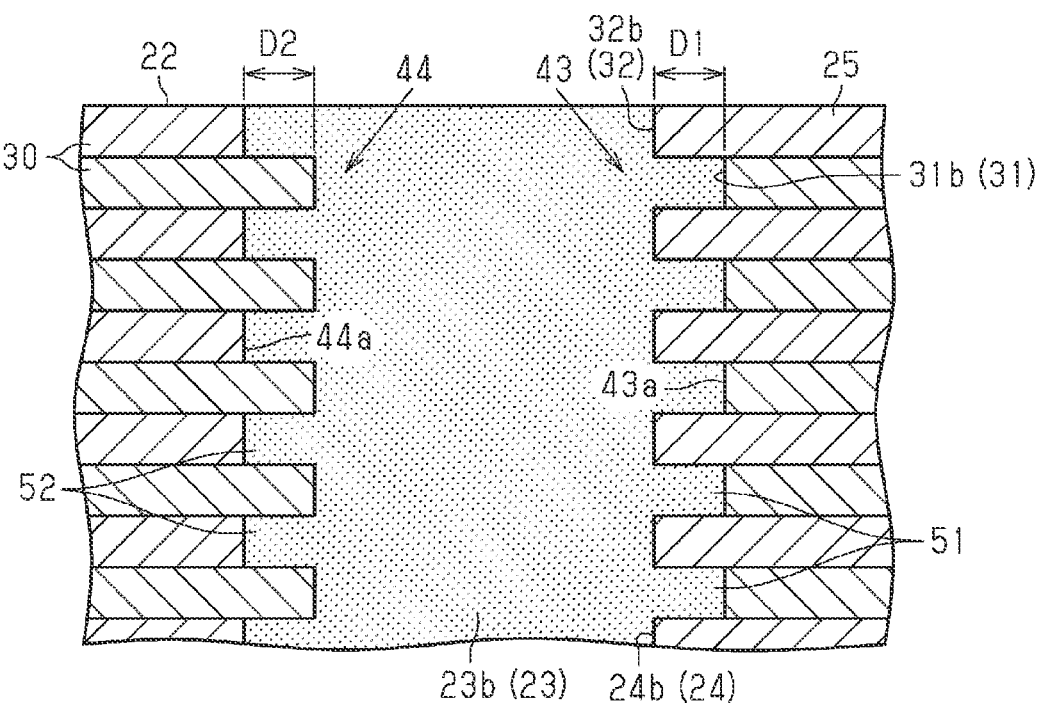
FIG. 3 is a cross-sectional view taken along the line III-III in FIG. 2.

As shown in FIG. 3, the first irregular portion 43 and the second irregular portion 44 are formed by the difference in radial position between the curved portions 31*b* of the first through-holes 31 and the curved portions 32*b* of the second through-holes 32. In the present embodiment, the radial width of the curved portions 31*b* of the first through-holes 31 and the radial width of the curved portions 32*b* of the second through-holes 32 are set to be equal to each other; and the curved portions 31*b* of the first through-holes 31 are located more radially outward than the curved portions 32*b* of the second through-holes 32.

The first irregular portion 43 has a plurality of recesses 43*a* in the axial direction. The corresponding permanent magnet 23, which is received in the magnet-receiving hole 24, has engaging portions 51 located respectively in the recesses 43*a* of the first irregular portion 43. The engaging portions 51 are axially retained with respect to the respective recesses 43*a*.

The second irregular portion 44 has a plurality of recesses 44*a* in the axial direction. The corresponding permanent magnet 23, which is received in the magnet-receiving hole 24, has engaging portions 52 located respectively in the recesses 44*a* of the second irregular portion 44. The engaging portions 52 are axially retained with respect to the respective recesses 44*a*. In addition, in the present embodiment, the depth D1 of the recesses 43*a* of the first irregular portion 43 provided in the inner side surface 41 of the magnet-receiving hole 24 is set to be equal to the depth D2 of the recesses 44*a* of the second irregular portion 44 provided in the outer side surface 42 of the magnet-receiving hole 24. Moreover, each of the depth D1 of the recesses 43*a* and the depth D2 of the recesses 44*a* gradually decreases toward the straight portions 24*a* of the magnet-receiving hole 24.

(Third Irregular Portions 45)

The third irregular portions 45 are formed by the difference between the shape of the straight portions 31*a* of the first through-holes 31 and the shape of the straight portions 32*a* of the second through-holes 32 at the radially outer ends thereof. As shown in FIG. 5(*a*), at the radially outer end of each of the straight portions 32*a* of the second through-holes 32, there is formed a protruding portion 32*c* that protrudes inward in the width direction of the straight portion 32*a*. Specifically, at the radially outer end of each of the straight portions 32*a*, the protruding portion 32*c* is formed by protruding a corner portion on the inner side of the folded substantially V-shape of the second through-hole 32. More specifically, the protruding portion 32*c* is formed by tapering the corner portion on the inner side of the folded substantially V-shape.

Figure 4:
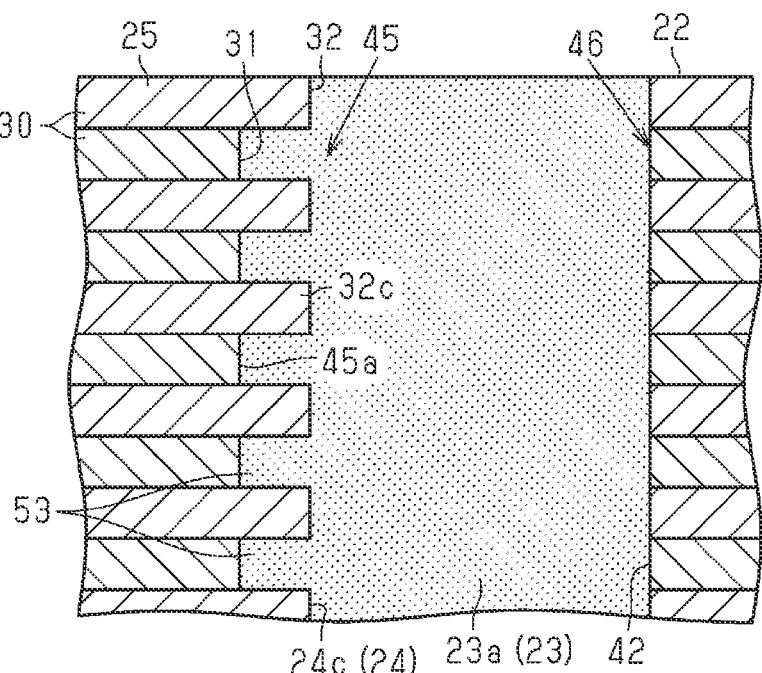
FIG. 4 is a cross-sectional view taken along the line IV-IV in FIG. 2.

As shown in FIG. 4, each of the third irregular portions 45 is formed by axially overlapping the straight portions 32*a* of the second through-holes 32 each of which has the protruding portion 32*c* provided therein and the straight portions 31*a* of the first through-holes 31 each of which has no protruding portion provided therein. Each of the third irregular portions 45 has a plurality of recesses 45*a* in the axial direction. The recesses 45*a* are formed of the straight portions 31*a* of the first through-holes 31 each of which has no protruding portion provided therein. The corresponding permanent magnet 23, which is received in the magnet-receiving hole 24, has engaging portions 53 located respectively in the recesses 45*a* of the third irregular portions 45. The engaging portions 53 are axially retained with respect to the respective recesses 45*a*.

As shown in FIG. 2, the non-irregular portions 46 are those portions of the interior surfaces of each of the magnet-receiving holes 24 where none of the first irregular portion 43, the second irregular portion 44 and the third irregular portions are formed. That is, when each of the magnet-receiving holes 24 is viewed in the axial direction, all the positions of the peripheral edges of the axially-overlapping first and second through-holes 31 and 32 coincide with each other at the non-irregular portions 46.

Next, operation of the rotor 20 of the rotating electric machine M according to the present embodiment will be described.

In the present embodiment, each of the permanent magnets 23, which are constituted of bonded magnets filled in the magnet-receiving holes 24, engages with the first irregular portion 43, the second irregular portion 44 and the third irregular portions 45 of the corresponding magnet-receiving hole 24 in a manner similar to a so-called anchor effect. Specifically, each of the outer core portions 25 axially engages, by the first irregular portion 43 and the third irregular portions 45 of the corresponding magnet-receiving hole 24, with the inside surface of the substantially V-shaped permanent magnet 23 that is received in the corresponding magnet-receiving hole 24. On the other hand, the outside surface of the substantially V-shaped permanent magnet 23 axially engages, by the second irregular portion 44 of the corresponding magnet-receiving hole 24, with a portion of the rotor core 22 other than the outer core portions 25. Consequently, when an axial excitation force is applied to the rotor 20 due to, for example, an external factor, it is possible to suppress the outer core portions 25 from vibrating in the axial direction with the bridge portions 22*c* serving as fulcrums.

Moreover, in the present embodiment, the interior surfaces of each of the magnet-receiving holes 24 also have the non-irregular portions 46 where none of the first irregular portion 43, the second irregular portion 44 and the third irregular portions 45 are formed. Consequently, compared to a configuration where irregular portions are formed over the entire interior surfaces of the magnet-receiving holes 24, it becomes possible to suppress axial leakage magnetic flux generated due to the irregular boundaries between the magnet-receiving holes 24 and the permanent magnets 23.

Next, advantageous effects achievable according to the present embodiment will be described.

(1) In the interior surfaces of the magnet-receiving holes 24, there are provided the first, second and third irregular portions 43, 44 and 45 each of which is formed by the difference in position between the peripheral edges of the axially-overlapping first and second through-holes 31 and 32. Moreover, the permanent magnets 23 have the engaging portions 51, 52 and 53 located respectively in the recesses 43*a*, 44*a* and 45*a* of the first, second and third irregular portions 43, 44 and 45. With this configuration, the first, second and third irregular portions 43, 44 and 45 provided in the interior surfaces of the magnet-receiving holes 24 engage respectively with the engaging portions 51, 52 and 53 of the permanent magnets 23 in the axial direction. Consequently, it becomes possible to suppress axial vibration of the outer core portions 25. As a result, it becomes possible to suppress deformation of the bridge portions 22*c* and the outer core portions 25 in the rotor core 22. Hence, it becomes possible to improve the strength of the rotor core 22 against axial vibration.

Furthermore, in the interior surfaces of the magnet-receiving holes 24, there are also provided the non-irregular portions 46 where none of the first, second and third irregular portions 43, 44 and 45 are formed. Consequently, compared to a configuration where irregular portions are formed over the entire interior surfaces of the magnet-receiving holes 24, it becomes possible to suppress axial leakage magnetic flux generated due to the irregular boundaries between the magnet-receiving holes 24 and the permanent magnets 23.

(2) The interior surfaces of each of the magnet-receiving holes 24 include the inner side surface 41 defining the corresponding outer core portion 25 and the outer side surface 42 facing the inner side surface 41. The first irregular portion 43 and the third irregular portions 45 are provided in the inner side surface 41, whereas the second irregular portion 44 is provided in the outer side surface 42. On the other hand, the non-irregular portions 46 are provided in each of the inner side surface 41 and the outer side surface 42. With this configuration, since each of the inner side surface 41 and the outer side surface 42 has irregularity, vibration of the corresponding outer core portion 25 can be more effectively suppressed by the irregularity. Moreover, since the non-irregular portions 46 are provided in each of the inner side surface 41 and the outer side surface 42, it becomes possible to more suitably achieve the effect of suppressing leakage magnetic flux by the non-irregular portions 46.

(3) Both the first irregular portion 43 and the second irregular portion 44 are provided within the region of the reference circle C1 whose diameter is half the outer diameter of the rotor core 22. The region delimited by the reference circle C1 is a radially inner region in the rotor core 22, i.e., a region that hardly contributes to the output torque. Therefore, by providing the first irregular portion 43 within the region of the reference circle C1, it becomes possible to suppress decrease in the output torque due to the provision of the first irregular portion 43.

(4) For each of the magnet-receiving holes 24 having the folded shape, both the first irregular portion 43 and the second irregular portion 44 are provided at the curved portion 24b of the magnet-receiving hole 24. With this configuration, it becomes possible to axially engage radially inner end parts of the outer core portions 25, which are located away from the bridge portions 22c, with the permanent magnets 23 by the first and second irregular portions 43 and 44 of the magnet-receiving holes 24. Consequently, it becomes possible to effectively suppress the outer core portions 25 from vibrating in the axial direction with the bridge portions 22c serving as fulcrums.

(5) The third irregular portions 45 are provided at the radially outer ends 24c of the magnet-receiving holes 24. With this configuration, it becomes possible to suppress vibration of the outer core portions 25 in the vicinities of radially outer end parts of the outer core portions 25.

(6) The protrusions of the third irregular portions 45 are constituted of the protruding portions 32c that protrude inward in the width directions of the magnet-receiving holes 24. The protruding portions 32c are formed in the second through-holes 32. Consequently, it becomes possible to reduce the circumferential length of the bridge portions 22c corresponding to the second through-holes 32. As a result, the formability of the core sheets 30 can be improved.

(7) The protruding portions 32c are formed, at the radially outer ends of the straight portions 32a of the second through-holes 32, by protruding the corner portions on the inner side of the folded substantially V-shape of the second through-holes 32. Consequently, it becomes possible to form the third irregular portions 45 by the protruding portions 32c while minimizing decrease in the magnetic flux of the permanent magnets 23. Further, by minimizing decrease in the magnetic flux of the permanent magnets 23 while reducing the volume of the permanent magnets 23 through the provision of the protruding portions 32c, it becomes possible to improve the output torque per unit volume of the permanent magnets 23.

(8) All the core sheets 30 forming the rotor core 22 are identical in configuration to each other. Each of the core sheets 30 has the first through-holes 31 and the second through-holes 32 that are different in shape from the first through-holes 31. Moreover, the core sheets 30 are laminated so that each of the magnet-receiving holes 24 is constituted of a mixture of the first and second through-holes 31 and 32 of the core sheets 30. With this configuration, it becomes possible to facilitate parts management by forming the core sheets 30 to be identical in configuration to each other; it also becomes possible to form the first irregular portion 43, the second irregular portion 44 and the third irregular portions 45 in each of the magnet-receiving holes 24 by the axially-overlapping first and second through-holes 31 and 32.

(9) In each of the core sheets 30, the first through-holes 31 and the second through-holes 32 are arranged alternately in the circumferential direction. Moreover, in forming the rotor core 22, the core sheets 30 are laminated so that: those core sheets 30 which are arranged at the first position and those core sheets 30 which are arranged at the second position that is rotated from the first position by 45° alternate in units of one core sheet; and each of the magnet-receiving holes 24 is constituted of a mixture of the first and second through-holes 31 and 32 of the core sheets 30. Consequently, it becomes possible to realize the rotor core 22 by the simple lamination manner of arranging every core sheet 30 at either the first position or the second position rotated from the first position by an angle corresponding to one magnet-receiving hole 24. Moreover, it also becomes possible to minimize magnetic imbalance that may occur due to the coexistence of the first through-holes 31 and the second through-holes 32, which are different in shape from each other, in each of the core sheets 30.

(10) The radial width of the curved portions 31b of the first through-holes 31 and the radial width of the curved portions 32b of the second through-holes 32 are set to be equal to each other. In addition, the radial width of the curved portions 31b and 32b of the first and second through-holes 31 and 32 corresponds to the thickness of the permanent magnets 23. Moreover, the first irregular portion 43 and the second irregular portion 44 are formed by the difference in radial position between the curved portions 31b of the first through-holes 31 and the curved portions 32b of the second through-holes 32. With this configuration, it becomes possible to form the first irregular portion 43 and the second irregular portion 44 in the interior surfaces of each of the magnet-receiving holes 24 while preventing the magnetic properties of the permanent magnets 23 formed in the respective magnet-receiving holes 24 from becoming different from each other.

The present embodiment can be modified and implemented as follows. Moreover, the present embodiment and the following modifications can also be implemented in combination with each other to the extent that there is no technical contradiction between them.

In the above-described embodiment, the protruding portions 32c are formed, at the radially outer ends of the straight portions 32a of the second through-holes 32, by protruding the corner portions on the inner side of the folded substantially V-shape of the second through-holes 32 in the tapered shape. However, the protruding portions 32c may be suitably modified to protrude in other shapes, such as a rectangular shape, a curved shape or the like.

In the above-described embodiment, the protruding portions 32c are formed, at the radially outer ends of the straight portions 32a of the second through-holes 32, by protruding the corner portions on the inner side of the folded substantially V-shape of the second through-holes 32. Alternatively, the protruding portions 32c may be formed, at the radially outer ends of the straight portions 32a of the second through-holes 32, by protruding corner portions on the outer side of the folded substantially V-shape of the second through-holes 32. Moreover, the protruding portions 32c may be formed in the first through-holes 31 instead of in the second through-holes 32.

Figure 6:
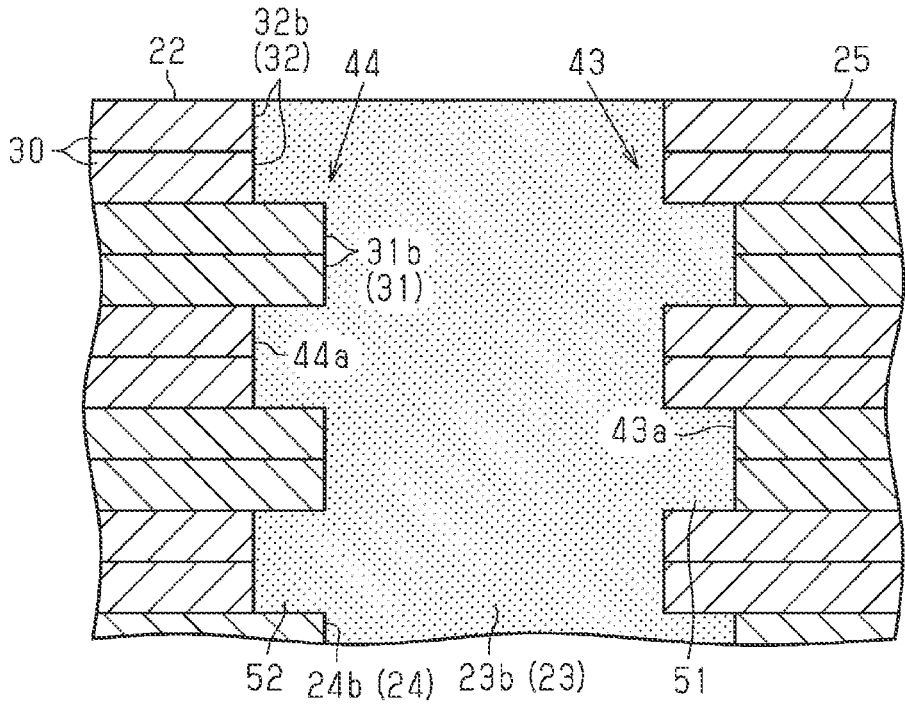
FIG. 6 is a cross-sectional view of a rotor according to a modification.

In the above-described embodiment, the core sheets 30 are arranged in units of one core sheet alternately at the first position and the second position that is rotated from the first position by 45°. Alternatively, the core sheets 30 may be arranged in units of plural core sheets alternately at the first position and the second position. In this case, the units of plural core sheets may be either units including the same number of core sheets or units including different numbers of core sheets. For example, FIG. 6 shows a configuration where the core sheets 30 are arranged in units of two core sheets alternately at the first position and the second position that is rotated from the first position by 45°. With such a configuration, it is possible to achieve substantially the same advantageous effects as achievable with the configuration according to the above-described embodiment.

In the above-described embodiment, in each of the core sheets 30, the first through-holes 31 and the second through-holes 32 are arranged alternately in the circumferential direction. That is, the first through-holes 31 are arranged at intervals of one second through-hole 32; and the second through-holes 32 are arranged at intervals of one first through-hole 31. However, the first through-holes 31 may alternatively be arranged at intervals of two or more second through-holes 32; otherwise, the second through-holes 32 may alternatively be arranged at intervals of two or more first through-holes 31.

Figure 7:
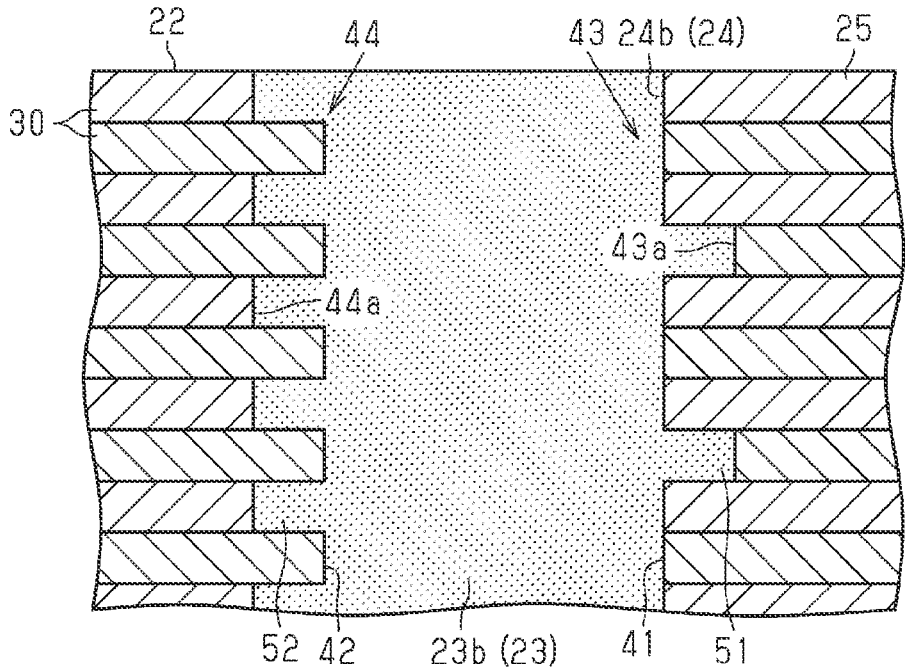
FIG. 7 is a cross-sectional view of a rotor according to another modification.

For example, as shown in FIG. 7, each of the magnet-receiving holes 24 may be configured so that the number of recesses and protrusions in the first irregular portion 43 is less than the number of recesses and protrusions in the second irregular portion 44. With this configuration, it will become possible to form the first irregular portion 43 in the inner side surface 41 of the magnet-receiving hole 24 while securing a large length of the inner side surface 41 in the extending direction of the magnet-receiving hole 24 and thus a large surface area of the inner side surface 41. Further, by securing a large surface area of the inner side surface 41, it will become possible to contribute to improvement in the output torque. In addition, leakage magnetic flux at the first irregular portion 43 provided in the inner side surface 41 is more likely to affect the output torque than leakage magnetic flux at the second irregular portion 44 provided in the outer side surface 42 is. Therefore, with the above configuration where the number of recesses and protrusions in the first irregular portion 43 is less than the number of recesses and protrusions in the second irregular portion 44, it will become possible to suppress decrease in the output torque due to leakage magnetic flux at the first irregular portion 43.

In the above-described embodiment, each of the magnet-receiving holes 24 is configured so that the depth D1 of the recesses 43a of the first irregular portion 43 is equal to the depth D2 of the recesses 44a of the second irregular portion 44. However, the formation of the first irregular portion 43 and the second irregular portion 44 is not particularly limited to this configuration.

Figure 8:
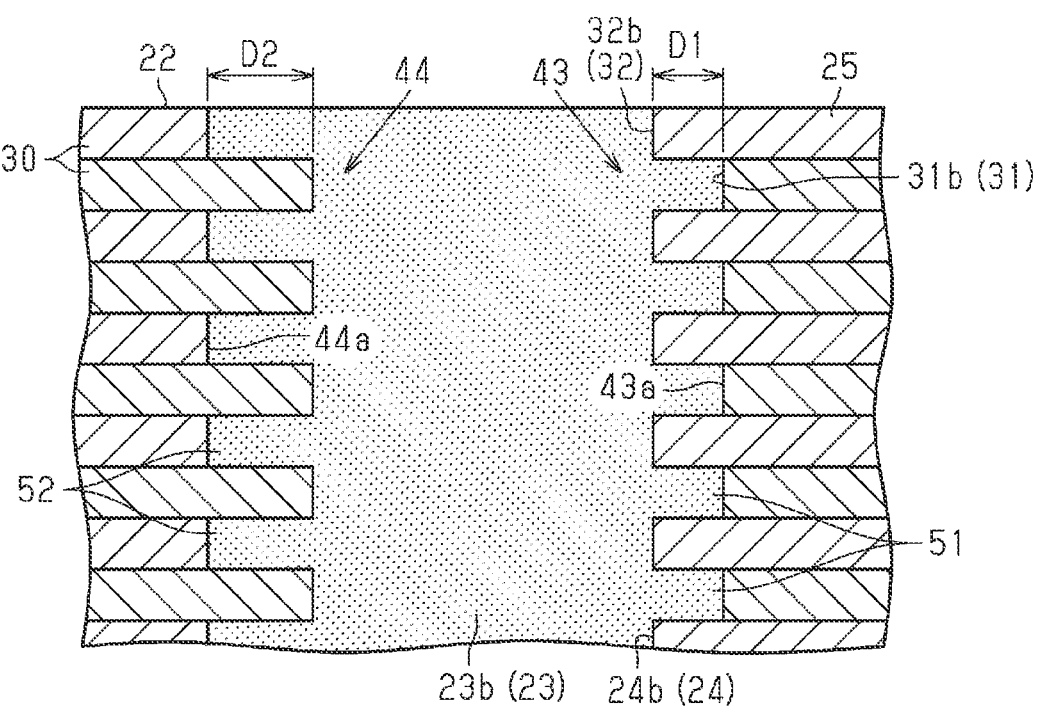
FIG. 8 is a cross-sectional view of a rotor according to another modification.

For example, as shown in FIG. 8, each of the magnet-receiving holes 24 may alternatively be configured so that the depth D1 of the recesses 43a of the first irregular portion 43 is less than the depth D2 of the recesses 44a of the second irregular portion 44. With this configuration, it will become possible to obtain a suitable axial engagement force between the interior surfaces of the magnet-receiving hole 24 and the corresponding permanent magnet 23 by the second irregular portion 44 provided in the outer side surface 42 while securing a large length of the inner side surface 41 in the extending direction of the magnet-receiving hole 24 and thus a large surface area of the inner side surface 41. In addition, leakage magnetic flux at the first irregular portion 43 provided in the inner side surface 41 is more likely to affect the output torque than leakage magnetic flux at the second irregular portion 44 provided in the outer side surface 42 is. Therefore, with the above configuration where the depth D1 of the recesses 43a of the first irregular portion 43 is less than the depth D2 of the recesses 44a of the second irregular portion 44, it will become possible to suppress decrease in the output torque due to leakage magnetic flux at the first irregular portion 43.

Figure 9:
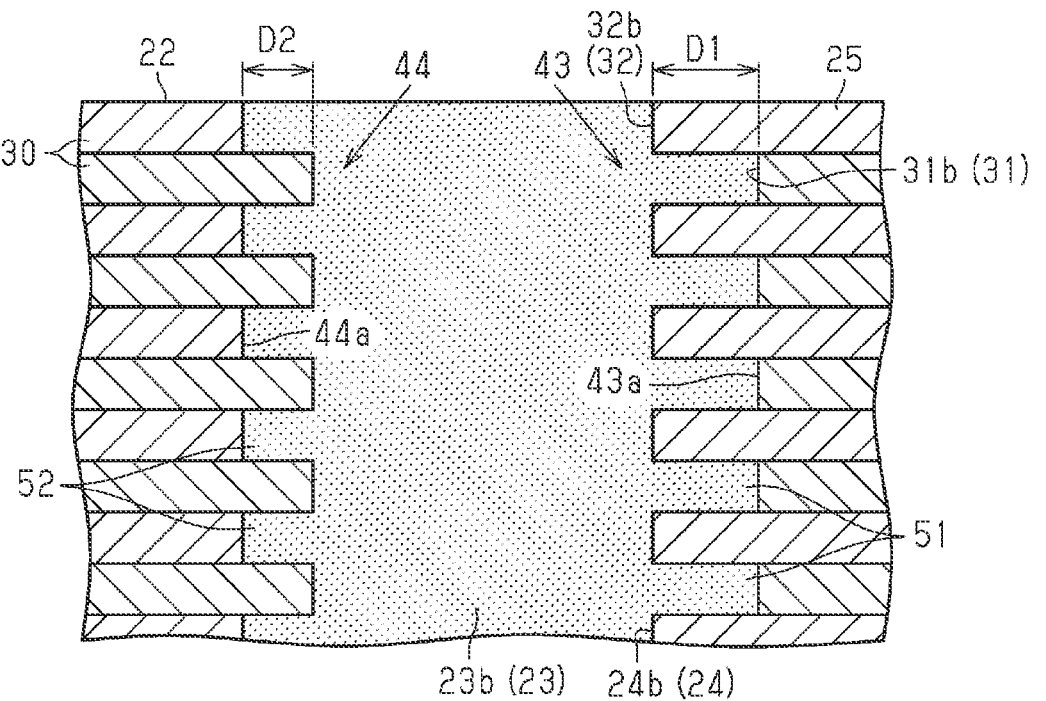
FIG. 9 is a cross-sectional view of a rotor according to another modification.

Moreover, for example, as shown in FIG. 9, each of the magnet-receiving holes 24 may alternatively be configured so that the depth D2 of the recesses 44a of the second irregular portion 44 is less than the depth D1 of the recesses 43a of the first irregular portion 43. Compared to the first irregular portion 43 provided in the inner side surface 41, it is possible to secure a greater length of the second irregular portion 44 provided in the outer side surface 42 in the extending direction of the magnet-receiving hole 24 in an axial view. Therefore, even if the depth D2 of the recesses 44a of the second irregular portion 44 is set to be small in order to suppress decrease in the output torque, it is easy to secure the engagement margin between the second irregular portion 44 and the engaging portions 52 of the corresponding permanent magnet 23. That is, with the above configuration where the depth D2 of the recesses 44a of the second irregular portion 44 is less than the depth D1 of the recesses 43a of the first irregular portion 43, it will become possible to obtain a suitable axial engagement force between the interior surfaces of the magnet-receiving hole 24 and the corresponding permanent magnet 23 while suppressing decrease in the output torque.

In the above-described embodiment, the radial width of the curved portions 31b of the first through-holes 31 and the radial width of the curved portions 32b of the second through-holes 32 are set to be equal to each other; and the first irregular portion 43 and the second irregular portion 44 are formed by the difference in radial position between the curved portions 31b of the first through-holes 31 and the curved portions 32b of the second through-holes 32. However, the formation of the first irregular portion 43 and the second irregular portion 44 is not particularly limited to this configuration, but may be changed as appropriate.

Figure 10:
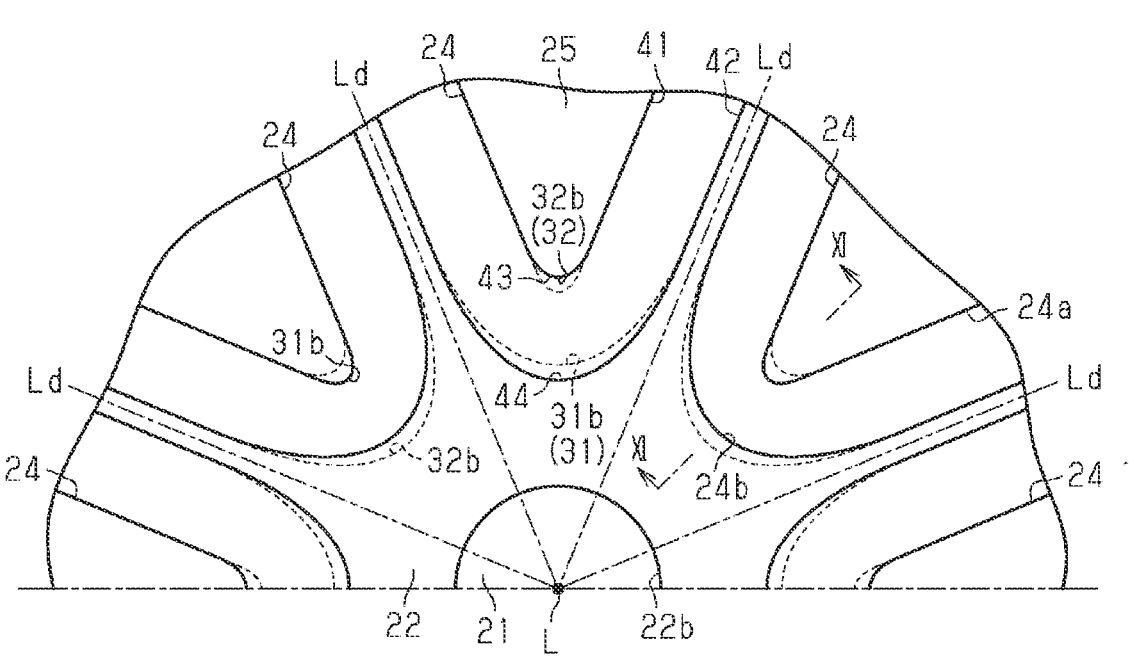
FIG. 10 is a plan view of a rotor according to another modification.
Figure 11:
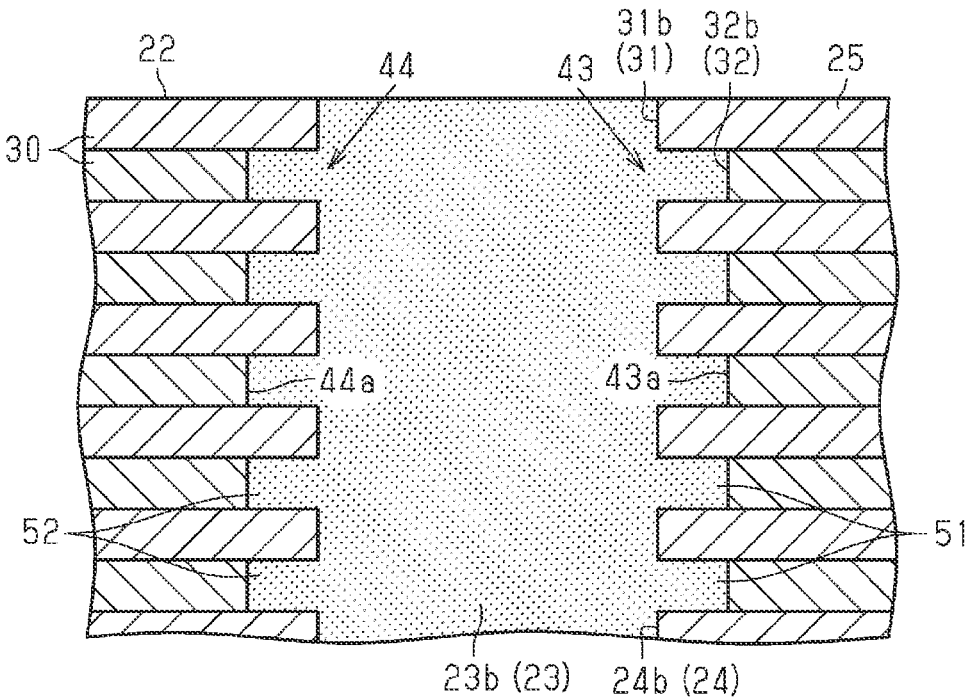
FIG. 11 is a cross-sectional view taken along the line XI-XI in FIG. 10.

For example, as shown in FIGS. 10 and 11, the first irregular portion 43 and the second irregular portion 44 may be formed by the difference in width between the curved portions 31b of the first through-holes 31 and the curved portions 32b of the second through-holes 32. More particularly, in the configuration shown in FIGS. and 11, the width of the curved portions 31b of the first through-holes 31 is set to be less than the width of the curved portions 32b of the second through-holes 32. On the other hand, the radial center position of the curved portions 31*b* of the first through-holes 31 and the radial center position of the curved portions 32*b* of the second through-holes 32 are set to the same position. With such a configuration, it is possible to achieve substantially the same advantageous effects as achievable with the configuration according to the above-described embodiment. It should be noted that it is also possible to combine a configuration where the positions of the curved portions 31*b* and 32*b* are set to be different from each other and a configuration where the widths of the curved portions 31*b* and 32*b* are set to be different from each other.

Figure 12:
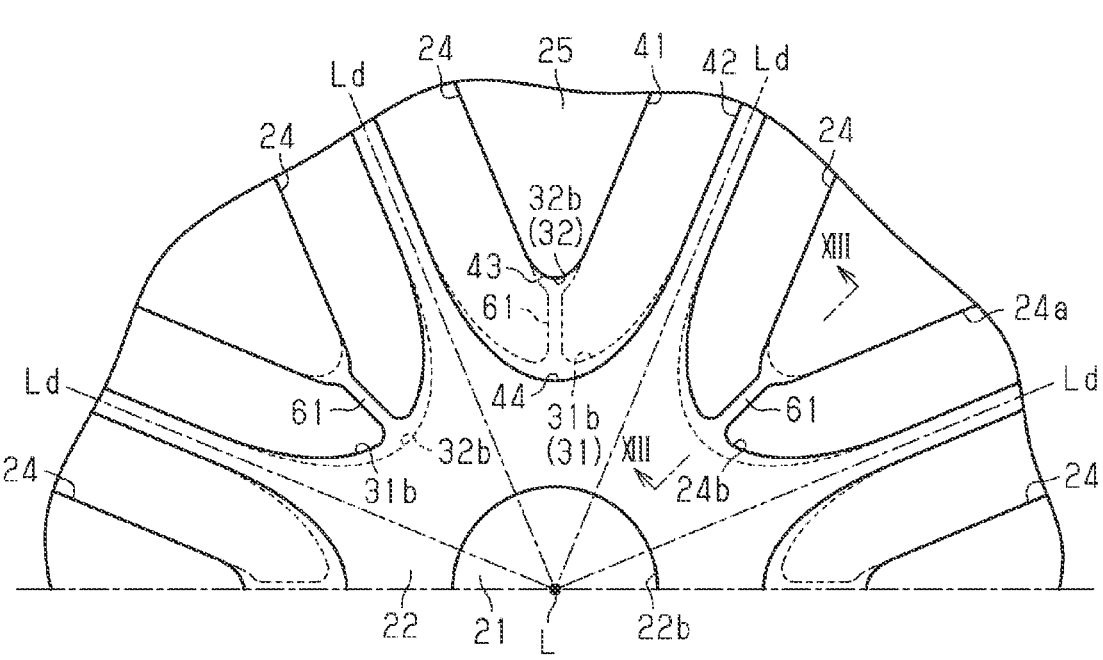
FIG. 12 is a plan view of a rotor according to another modification.
Figure 13:
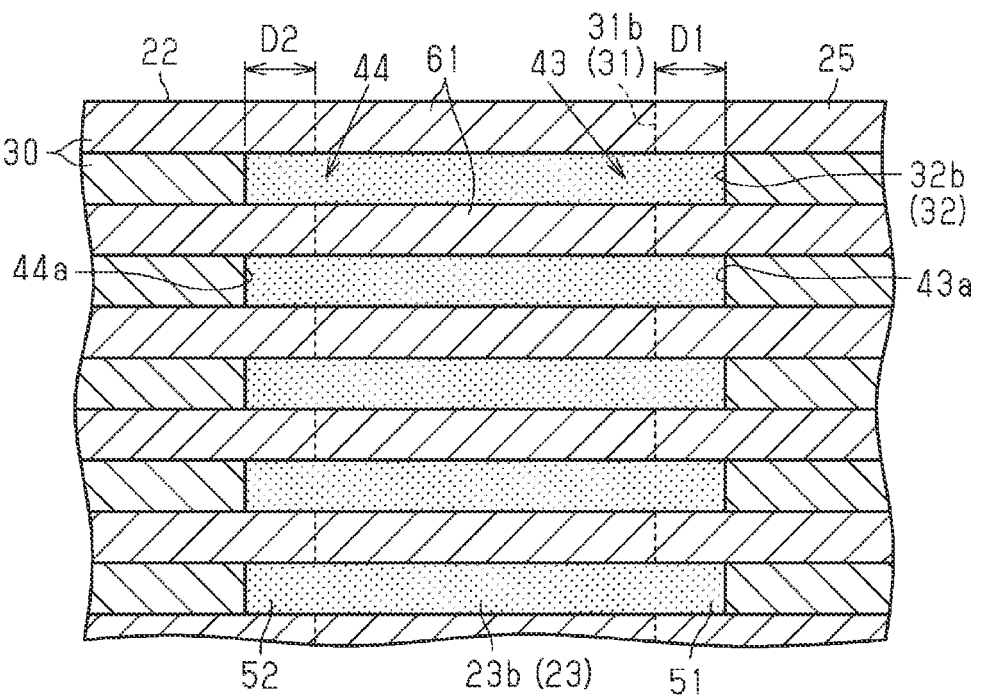
FIG. 13 is a cross-sectional view taken along the line XIII-XIII in FIG. 12.

In the rotor core 22 in the above-described embodiment and modifications, for each of the magnet-receiving holes 24, connection portions may be formed at an intermediate position in the folded shape of the magnet-receiving hole 24 to connect inner peripheral edges of the magnet-receiving hole 24 with each other; the inner peripheral edges face each other in a width direction of the magnet-receiving hole 24. An example of a rotor core having such connection portions is shown in FIGS. 12 and 13. In addition, in FIGS. 12 and 13, there is shown, as an example, a configuration obtained by adding such connection portions to the configuration shown in FIGS. 10 and 11.

As shown in FIG. 12, in this example, in the rotor core 22, for each of the magnet-receiving holes 24, connection portions 61 are formed at an intermediate position in the folded shape of the magnet-receiving hole 24 to connect inner peripheral edges of the magnet-receiving hole 24 with each other; the inner peripheral edges face each other in a width direction of the magnet-receiving hole 24. More particularly, in this example, the connection portions 61 are formed at the curved portion 24*b* of the magnet-receiving hole 24.

Moreover, in this example, of the first through-holes 31 and the second through-holes 32, the connection portions 61 are formed in only the first through-holes 31. Specifically, each of the connection portions 61 is formed at the curved portion 31*b* of one of the first through-holes 31. More specifically, each of the connection portions 61 extends in a width direction of the curved portion 31*b* to connect inner peripheral edges of the curved portion 31*b* with each other; the inner peripheral edges face each other in the width direction of the curved portion 31*b*. Moreover, all the widths of the connection portions 61 of the first through-holes 31 in the directions perpendicular to the extending directions of the connection portions 61 are set to be equal to each other. In addition, in a state where the core sheets 30 have been laminated to form the rotor core 22, in each of the magnet-receiving holes 24, all the connection portions 61 are arranged in alignment with each other in the axial direction.

Furthermore, in this example, the width of the curved portions 31*b* of the first through-holes 31 is set to be smaller than the width of the curved portions 32*b* of the second through-holes 32. Consequently, by forming the connection portions 61 at the curved portions 31*b* of the first through-holes 31, it becomes possible to reduce the length of the connection portions 61 in the width direction of the curved portions 31*b* and 32*b* as compared with the case of forming connection portions at the curved portions 32*b* of the second through-holes 32.

Furthermore, in this example, no connection portions are formed in the second through-holes 32. Therefore, at the curved portion 24*b* of each of the magnet-receiving holes 24, there is, in every other core sheet 30, a location where no connection portion is formed. In the process of forming the permanent magnets 23, the magnet material flows into the location where no connection portion is formed. In addition, in each of the magnet-receiving holes 24, the connection portions 61 are formed between the first irregular portion 43 and the second irregular portion 44. In other words, the connection portions 61 connect the first irregular portion 43 and the second irregular portion 44 with each other.

With the configuration shown in FIGS. 12 and 13, each of the outer core portions 25 is supported at three locations, i.e., at two bridge portions 22*c* that are provided inevitably due to the configuration of the corresponding magnet-receiving hole 24 and at the curved portion 24*b* of the corresponding magnet-receiving hole 24 where the connection portions 61 are newly added. Consequently, the strength of the outer core portions 25 against the centrifugal force is improved. Moreover, for each of the outer core portions 25, the two bridge portions 22*c* and the connection portions 61 supporting the outer core portion 25 are arranged in a well-balanced manner around the outer core portion 25. Such an arrangement contributes to the stable support of the outer core portions 25.

Furthermore, axial vibration of the outer core portions 25 can be suppressed by the first, second and third irregular portion 43, 44 and 45 formed in the interior surfaces of the magnet-receiving holes 24. Consequently, when an axial excitation force is applied to the rotor 20, deformation of the connection portions 61 due to axial vibration of the outer core portions 25 can be suppressed by the first, second and third irregular portion 43, 44 and 45 of the magnet-receiving holes 24. That is, the configuration according to this example can contribute to both improvement in the strength of the outer core portions 25 against the centrifugal force and improvement in the axial strength of the outer core portions 25.

Furthermore, in this example, the core sheets 30 are arranged in units of one core sheet alternately at the first position and the second position. Therefore, the connection portions 61 of the first through-holes 31 are located in every other core sheet 30 and thus not overlaid on one another. Consequently, it becomes possible to minimize magnetic flux leakage through the connection portions 61.

In addition, connection portions 61 as described above may also be formed in the first through-holes 31 in the above-described embodiment.

Moreover, in the example shown in FIGS. 12 and 13, the connection portions 61 are formed in the first through-holes 31. As an alternative, connection portions 61 may be formed in the second through-holes 32. As another alternative, connection portions 61 may be formed in both the first through-holes 31 and the second through-holes 32. In this case, the connection portions 61 will be continuously formed over the entire axial length of the magnet-receiving holes 24. Consequently, each of the permanent magnets 23 formed in the substantially V-shape in an axial view will be divided into two segments by the corresponding connection portion 61. That is, in this case, for each of the permanent magnets 23, the two segments of the permanent magnet 23 which are separated from each other by the corresponding connection portion 61 will together form the substantially V-shape of the permanent magnet 23, i.e., a folded shape that is convex radially inward.

Furthermore, in the example shown in FIGS. 12 and 13, one connection portion 61 is provided in each of the first through-holes 31. Alternatively, two or more connection portions may be provided in each of the first through-holes 31. In this case, each of the outer core portions 25 will be supported at four or more locations, i.e., at two bridge portions 22*c* that are provided inevitably due to the configuration of the corresponding magnet-receiving hole 24 and two or more locations where the two or more connection portions are newly added.

Moreover, in the above example, the connection portions 61 are provided at the curved portions 24*b* of the magnet-receiving holes 24. Alternatively, the connection portions 61 may be provided at the straight portions 24*a* of the magnet-receiving holes 24.

Furthermore, in the above example, the connection portions 61 extend in the width directions of the curved portions 24*b* of the magnet-receiving holes 24, i.e., in the radial directions of the rotor 20. Alternatively, the connection portions 61 may be suitably modified to extend in directions oblique to the width directions of the curved portions 24*b* of the magnet-receiving holes 24, i.e., directions other than the radial directions of the rotor 20.

In the above-described embodiment, in each of the core sheets 30, the number of the first through-holes 31 is set to be equal to the number of the second through-holes 32. Alternatively, in each of the core sheets 30, the number of the first through-holes 31 may be set to be larger or smaller than the number of the second through-holes 32. In addition, regardless of the number of the first through-holes 31 and the number of the second through-holes 32, the first through-holes 31 and the second through-holes 32 may be shaped so as to be point-symmetrical with respect to the axis L of the rotor 20, thereby suppressing magnetic imbalance in the circumferential direction.

For example, in the above-described embodiment, the rotor core 22 may be modified so that in each of the core sheets 30, there are formed two first through-holes 31 and four second through-holes 32. Moreover, the two first through-holes 31 may be located apart from each other by 180° in the circumferential direction, so as to face each other. In this case, it will become possible to suppress magnetic imbalance in the circumferential direction. In addition, in the examples shown in FIGS. 10 to 13, the width of the curved portions 31*b* of the first through-holes 31 is smaller than the width of the curved portions 32*b* of the second through-holes 32. That is, the thickness of the curved portions 23*b* of the permanent magnets 23 is smaller in the first through-holes 31 than in the second through-holes 32. Therefore, by setting the number of the first through-holes 31 to be smaller than the number of the second through-holes 32, it will become possible to suppress decrease in the output torque. Furthermore, in the above-described embodiment, in the process of laminating the core sheets 30 to form the rotor core 22, each of the core sheets 30 is rotated by 45° corresponding to one magnetic pole. Alternatively, in the laminating process, each of the core sheets 30 may be rotated by an angle other than 45°, such as an angle corresponding to two magnetic poles or an angle corresponding to three magnetic poles.

In the above-described embodiment, the positions of forming the irregular portions in the interior surfaces of the magnet-receiving holes 24 may be changed as appropriate. For example, in the interior surfaces of the magnet-receiving holes 24, irregular portions may be formed at intermediate parts of the straight portions 24*a* of the magnet-receiving holes 24 in an axial view. Moreover, in the above-described embodiment, any one of the first irregular portion 43, the second irregular portion 44 and the third irregular portions 45 may be omitted from the magnet-receiving holes 24.

In the above-described embodiment, in the interior surfaces of each of the magnet-receiving holes 24, the first irregular portion 43, the second irregular portion 44 and the third irregular portions 45 are formed at some locations in the extending direction of the magnet-receiving hole 24; and the non-irregular portions 46 are formed at the other locations in the extending direction of the magnet-receiving hole 24. Alternatively, in the interior surfaces of each of the magnet-receiving holes 24, irregular portions may be formed at some locations in the axial direction; and non-irregular portions may be formed at the other locations in the axial direction.

In the above-described embodiment, all the core sheets 30 forming the rotor core 22 are identical in configuration to each other; and each of the core sheets 30 includes two types of through-holes having mutually different shapes, i.e., the first through-holes 31 and the second through-holes 32. Alternatively, the rotor core 22 may be formed by: (i) preparing two types of core sheets having mutually different through-hole shapes, i.e., first core sheets in each of which only first through-holes 31 are formed in the circumferential direction and second core sheets in each of which only second through-holes 32 are formed in the circumferential direction; and (ii) laminating the first core sheets and the second core sheets alternately in units of one core sheet or in units of plural core sheets in the axial direction so that each of the magnet-receiving holes 24 is constituted of a mixture of the first and second through-holes 31 and 32 of the first and second core sheets.

The number of magnetic poles of the rotor 20, i.e., the number of the permanent magnets 23 and the number of the magnet-receiving holes 24 may be changed as appropriate. Moreover, the number of magnetic poles of the stator 10 may also be changed as appropriate.

In addition to the above modifications, the configuration of the rotating electric machine M may also be modified as appropriate.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotor comprising:

a rotor core having a plurality of magnet-receiving holes formed in a folded shape that is convex radially inward; and a plurality of permanent magnets embedded respectively in the magnet-receiving holes of the rotor core, wherein:

the rotor core includes a plurality of core sheets that are laminated in an axial direction;

each of the core sheets has a plurality of through-holes for magnets;

the magnet-receiving holes of the rotor core are constituted of those of the through-holes of the axially-laminated core sheets which overlap each other in the axial direction;

interior surfaces of the magnet-receiving holes have irregular portions each of which is formed by a difference in position between peripheral edges of the axially-overlapping through-holes, and non-irregular portions where none of the irregular portions are formed; and the permanent magnets have engaging portions located respectively in recesses of the irregular portions.

2. The rotor as set forth in claim 1, wherein:

the rotor core has outer core portions located respectively radially outside the permanent magnets;

the interior surfaces of the magnet-receiving holes include inner side surfaces respectively defining the outer core portions and outer side surfaces respectively facing the inner side surfaces;

the irregular portions are provided in both the inner side surfaces and the outer side surfaces; and the non-irregular portions are also provided in both the inner side surfaces and the outer side surfaces.

3. The rotor as set forth in claim 2, wherein:

a depth of the recesses of the irregular portions provided in the inner side surfaces of the magnet-receiving holes is set to be less than or equal to a depth of the recesses of the irregular portions provided in the outer side surfaces of the magnet-receiving holes.

4. The rotor as set forth in claim 2, wherein:

a depth of the recesses of the irregular portions provided in the outer side surfaces of the magnet-receiving holes is set to be less than or equal to a depth of the recesses of the irregular portions provided in the inner side surfaces of the magnet-receiving holes.

5. The rotor as set forth in claim 2, wherein:

the number of recesses and protrusions in the irregular portions provided in the inner side surfaces of the magnet-receiving holes is less than the number of recesses and protrusions in the irregular portions provided in the outer side surfaces of the magnet-receiving holes.

6. The rotor as set forth in claim 1, wherein:

the irregular portions comprise irregular portions which are provided radially inward of a half of an outer diameter of the rotor core.

7. The rotor as set forth in claim 1, wherein:

the irregular portions comprise irregular portions which are provided respectively at radially outer ends of the magnet-receiving holes.

8. The rotor as set forth in claim 1, wherein:

all the core sheets are identical in configuration to each other;

in each of the core sheets, the through-holes comprise first through-holes and second through-holes that are different in shape from the first through-holes; and each of the magnet-receiving holes of the rotor core is constituted of a mixture of the first and second through-holes of the core sheets.

9. The rotor as set forth in claim 8, wherein:

in each of the core sheets, the first through-holes and the second through-holes are arranged alternately in a circumferential direction.

10. The rotor as set forth in claim 9, wherein:

every predetermined number of the core sheets are arranged at either a first position or a second position rotated from the first position by an angle corresponding to one of the magnet-receiving holes.

11. The rotor as set forth in claim 1, wherein:

the irregular portions comprise irregular portions which are provided at curved portions of the magnet-receiving holes that are formed in the folded shape.

12. The rotor as set forth in claim 1, wherein:

the rotor core has connection portions each of which is provided at an intermediate position in the folded shape of a corresponding one of the magnet-receiving holes to connect inner peripheral edges of the corresponding magnet-receiving hole which face each other in a width direction of the corresponding magnet-receiving hole.

13. The rotor as set forth in claim 12, wherein:

each of the connection portions is provided at a curved portion of the corresponding magnet-receiving hole that is formed in the folded shape.

14. A rotating electric machine comprising:

a rotor that comprises a rotor core having a plurality of magnet-receiving holes formed in a folded shape that is convex radially inward, and a plurality of permanent magnets embedded respectively in the magnet-receiving holes of the rotor core; and a stator configured to apply a rotating magnetic field to the rotor, wherein:

the rotor core includes a plurality of core sheets that are laminated in an axial direction;

each of the core sheets has a plurality of through-holes for magnets;

the magnet-receiving holes of the rotor core are constituted of those of the through-holes of the axially-laminated core sheets which overlap each other in the axial direction;

interior surfaces of the magnet-receiving holes have irregular portions each of which is formed by a difference in position between peripheral edges of the axially-overlapping through-holes, and non-irregular portions where none of the irregular portions are formed; and the permanent magnets have engaging portions located respectively in recesses of the irregular portions.

15. The rotor as set forth in claim 1, wherein the permanent magnets are bonded magnets filled respectively in the magnet-receiving holes.

16. The rotor as set forth in claim 14, wherein the permanent magnets are bonded magnets filled respectively in the magnet-receiving holes.

* * * * *